(12) United States Patent
Petersen et al.

(10) Patent No.: US 8,760,284 B2
(45) Date of Patent: Jun. 24, 2014

(54) LISTENING SYSTEM COMPRISING AN ALERTING DEVICE AND A LISTENING DEVICE

(75) Inventors: Svend Oscar Petersen, Smørum (DK); Mette Boel Pedersen, Smørum (DK); Gabriel Aldaz, Smørum (DK)

(73) Assignee: Oticon A/S, Smorum (DK)

( * ) Notice: Subject to any disclaimer, the term of this patent is extended or adjusted under 35 U.S.C. 154(b) by 158 days.

(21) Appl. No.: 13/336,427

(22) Filed: Dec. 23, 2011

(65) Prior Publication Data
US 2012/0169454 A1  Jul. 5, 2012

Related U.S. Application Data

(60) Provisional application No. 61/427,803, filed on Dec. 29, 2010.

(30) Foreign Application Priority Data

Dec. 29, 2010  (EP) ..................................... 10197223

(51) Int. Cl.
| | |
|---|---|
| G08B 1/08 | (2006.01) |
| G09B 21/00 | (2006.01) |
| G08B 29/00 | (2006.01) |
| H04R 25/00 | (2006.01) |
| G08B 29/18 | (2006.01) |
| H04R 1/10 | (2006.01) |
| G08B 7/06 | (2006.01) |
| G10L 15/26 | (2006.01) |

(52) U.S. Cl.
CPC ............ *H04R 25/554* (2013.01); *G09B 21/006* (2013.01); *G08B 1/08* (2013.01); *H04R 2225/55* (2013.01); *G10L 15/265* (2013.01); *G09B 21/00* (2013.01); *H04R 2225/41* (2013.01); *G08B 29/18* (2013.01); *H04R 2225/67* (2013.01); *H04R 25/552* (2013.01); *H04R 1/1091* (2013.01); *G08B 7/06* (2013.01)
USPC ....... 340/539.11; 340/4.1; 340/506; 381/315; 381/23.1

(58) Field of Classification Search
USPC .............. 340/539.11, 4.1, 506; 381/315, 23.1
See application file for complete search history.

(56) References Cited

U.S. PATENT DOCUMENTS

| | | | |
|---|---|---|---|
| 4,955,729 A | 9/1990 | Marx | |
| 5,686,882 A * | 11/1997 | Giani | ......................... 340/407.1 |

(Continued)

FOREIGN PATENT DOCUMENTS

| | | |
|---|---|---|
| EP | 1 460 769 A1 | 9/2004 |
| EP | 1 480 492 A2 | 11/2004 |

(Continued)

OTHER PUBLICATIONS

European Search Report issued on Jun. 22, 2011.

*Primary Examiner* — George Bugg
*Assistant Examiner* — Munear Akki
(74) *Attorney, Agent, or Firm* — Buchanan Ingersoll & Rooney P.C.

(57) ABSTRACT

A listening system that eases the acknowledgement of 'alarm signals', as e.g. issued by alarm indicators, in the environment of a user in difficult listening situations. The listening system is adapted to issue specific ALARM mode signals to the user corresponding to said external alarm signals, when said listening system is in an ALARM mode. An advantage of the present system is that a user is able to take notice of alarms from normal indicators even in case of a hearing impairment and/or when located in a noisy environment. The system may e.g. be used for the hearing instruments, ear protection devices, earphones, headsets or combinations thereof.

23 Claims, 3 Drawing Sheets

(56) References Cited

U.S. PATENT DOCUMENTS

| | | | |
|---|---|---|---|
| 6,782,106 B1* | 8/2004 | Kong et al. | 381/74 |
| 7,062,223 B2 | 6/2006 | Gerber et al. | |
| 7,120,488 B2* | 10/2006 | Nova et al. | 607/2 |
| 7,277,553 B2 | 10/2007 | Reithinger | |
| 7,522,739 B2 | 4/2009 | Rass et al. | |
| 7,612,655 B2* | 11/2009 | Kolz et al. | 340/407.1 |
| 7,742,612 B2 | 6/2010 | Frohlich et al. | |
| 8,203,444 B2* | 6/2012 | Strohallen et al. | 340/506 |
| 2002/0000470 A1* | 1/2002 | Lanzaro et al. | 235/462.45 |
| 2003/0144838 A1 | 7/2003 | Allegro | |
| 2005/0036638 A1 | 2/2005 | Reithinger | |
| 2005/0080627 A1* | 4/2005 | Hennebert et al. | 704/270 |
| 2005/0105750 A1* | 5/2005 | Frohlich et al. | 381/314 |
| 2005/0238190 A1* | 10/2005 | Rohrlein | 381/312 |
| 2005/0255843 A1 | 11/2005 | Hilpisch et al. | |
| 2006/0245609 A1* | 11/2006 | Arz et al. | 381/315 |
| 2007/0080823 A1* | 4/2007 | Fu et al. | 340/825.22 |
| 2008/0111677 A1* | 5/2008 | Kolz et al. | 340/539.11 |
| 2008/0183471 A1 | 7/2008 | Atal | |
| 2008/0226107 A1 | 9/2008 | Boguslavskij et al. | |
| 2009/0010466 A1 | 1/2009 | Haikonen | |
| 2009/0076816 A1 | 3/2009 | Bradford et al. | |
| 2009/0303031 A1* | 12/2009 | Strohallen et al. | 340/501 |
| 2009/0322513 A1* | 12/2009 | Hwang et al. | 340/539.12 |
| 2010/0226516 A1 | 9/2010 | Grafenberg et al. | |
| 2010/0302031 A1* | 12/2010 | Komninos | 340/539.26 |
| 2011/0007916 A1 | 1/2011 | Chapero-Rueda et al. | |

FOREIGN PATENT DOCUMENTS

| | | |
|---|---|---|
| EP | 2 211 579 A1 | 7/2010 |
| JP | 2010-041302 A | 2/2010 |
| WO | WO 03/098907 A2 | 11/2003 |
| WO | WO 2007/116103 A2 | 10/2007 |
| WO | WO 2008/055960 A1 | 5/2008 |
| WO | WO 2008/067638 A1 | 6/2008 |
| WO | WO 2008/071807 A2 | 6/2008 |
| WO | WO 2010/049543 A2 | 5/2010 |

* cited by examiner

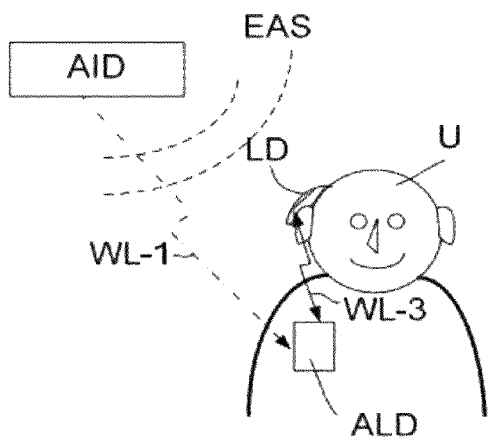
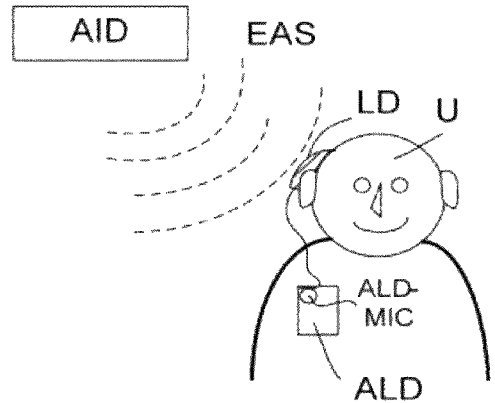
FIG. 1a         FIG. 1b
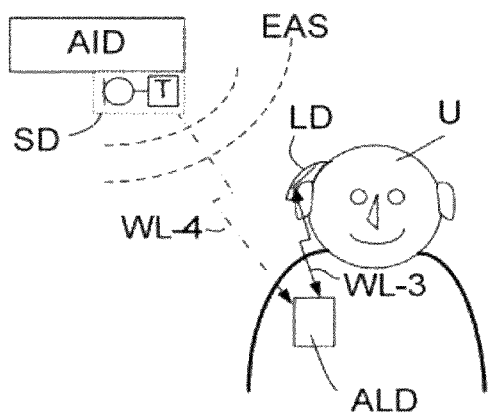
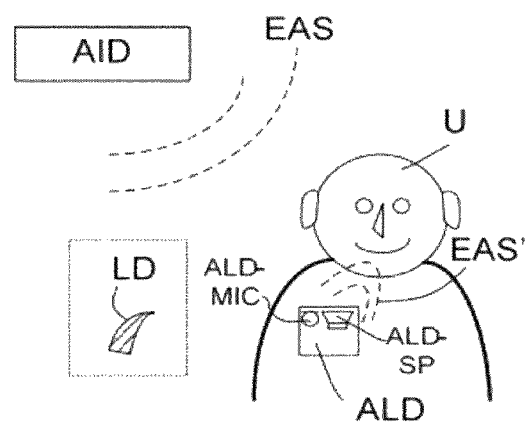
FIG. 1c         FIG. 1d

LISTENING SYSTEM COMPRISING AN ALERTING DEVICE AND A LISTENING DEVICE

TECHNICAL FIELD

The present application relates to the field of listening devices, especially such devices that are suited for compensating for a user's hearing impairment and/or for protecting a user's hearing ability against or to isolate a user from a noisy environment. The disclosure relates specifically to a listening system comprising a listening device and an alerting device.

The disclosure may e.g. be useful in applications such as hearing instruments, ear protection devices, earphones, headsets or combinations thereof.

BACKGROUND ART

The following account of the prior art relates to one of the areas of application of the present disclosure, hearing aids.

When a hearing aid user takes off the hearing aids, it becomes more difficult for him or her to hear important alarms, e.g.:

In the home: Door bells, phone ringing, alarm clock, smoke or fire alarm.

In the traffic: Sirens from ambulance or fire engine, horns beeping.

Today, solutions exist where a hearing impaired person can get a loud acoustical alarm, a visual flash or a vibration on the pocket that is connected to the ordinary alarm (doorbell, phone, smoke alarm, etc.).

U.S. Pat. No. 7,522,739 describes an automatic (e.g. temperature based) on/off switch in a hearing aid. WO 2008/055960 A1 describes an alarm system for detecting en alarm state and for alarming a user of a cochlear implant- (CI-) type hearing aid even if the normal control device for the hearing aid is inactive. US 2009/0076816 A1 describes a hearing aid system comprising a handheld device with a display for visually indicating different (otherwise acoustically indicated) events (e.g. telephone calls, alarms, etc.), so that the user thereby is alerted to the event in addition to the normal acoustic indication. US 2009/0010466 A1 describes a hearing aid system comprising a portable device, which can detect a number of specific types of sound (e.g. traffic noise, a door bell, alarms, etc.) and give the user corresponding alarms via the hearing aid. WO 2008/067638 A1 describes a hearing aid system comprising a portable unit, which can detect sound signals (e.g. alarms) in the environment of a user. When an alarm has been detected, the unit vibrates and a corresponding message is shown in a display. The user can then call for help via the portable unit.

DISCLOSURE OF INVENTION

An alternative solution according to the present disclosure is to provide the user with an alerting device (e.g. body worn alerting device) that is adapted to detect or to receive information concerning the operational state of the listening device(s) (e.g. one, or a pair of, hearing aid(s)), and then enter into an ALARM mode, when the listening device(s) is/are in a non-operational state. In the ALARM mode the alerting device is adapted to detect external alarms (door bell, phone ringing, smoke alarm, specific voice, etc.). When the alerting device detects an external alarm and at the same time detects or is aware of the fact that the listening device(s) is/are in a non-operational state (e.g. turned OFF and/or located out of the ear of the user), the alerting device starts to alert the user. The alerts can have any practical form, e.g. the emission of an acoustic alarm signal, the vibration of a device located on a user (e.g. in a pocket or worn around the neck of the user), the emission of a light signal (e.g. in the form of a flashing light indicator), etc., or combinations thereof.

In the present context, the term 'an external alarm' is taken to mean an indication intended to convey a message to a person ('the user'), typically to draw the attention of the person to a specific event, e.g. a danger, and/or to urge the person to look in a particular direction.

An object of the present application is to provide a system that eases the acknowledgement of 'alarm signals', as e.g. issued by alarm indicators, in the environment of a user in difficult listening situations. A specific object is to assist a hearing impaired user to acknowledge alarm signals issued by normal alarm indicators (i.e. alarm indicators that are not specifically aimed at hearing impaired persons or persons wearing ear phones or ear protection devices).

Objects of the application are achieved by the invention described in the accompanying claims and as described in the following.

A Listening System:

An object of the application is achieved by A listening system. The listening system comprises, a listening device adapted to be worn at or in an ear of a user, and an alerting device adapted to detect or receive an external alarm signal, wherein the listening device and the alerting device each comprise at least one communication interface allowing to establish a communication link between them, the alerting device is adapted to sense or receive information as to whether or not the listening device is in operational use, and the listening system is adapted to operate in at least two modes, a NORMAL mode, when said listening device is in operational use, and an ALARM mode, when said listening device is NOT in operational use; and wherein said listening system is adapted to issue specific ALARM mode signals to the user corresponding to said external alarm signals, when said listening system is in an ALARM mode.

An advantage of the present system is that a user is able to take notice of alarms from normal indicators even in case of a hearing impairment and/or when located in a noisy environment and even when a listening device is not in operational use.

NORMAL Mode and ALARM Mode Signals:

In general, the system is assumed to be in a NORMAL mode, when the listening device is in an operational state and in an ALARM mode when the listening device is in a non-operational state. In an embodiment, the listening device is assumed to be in a non-operational state, when an operational state of the listening device is NOT detected. In an alternative embodiment, the listening device is assumed to be in an operational state, when a non-operational state of the listening device is NOT detected. In an embodiment, each of the operational and non-operational states are positively detected.

In an embodiment, the listening system is adapted to alert the user through the listening device(s) (e.g. hearing aid(s)) in a NORMAL operational mode (e.g. when the listening system detects that the user wears the listening device(s) in a normal way), and to use alternative alerts (loud acoustical alarm signal, vibration and/or flash), when the system is in an ALARM mode (e.g. when the listening system detects that the listening device(s) are not in use).

In an embodiment, the listening system is adapted to issue specific NORMAL mode signals to the user corresponding to the normal external acoustic and/or optical alarm signals, when the listening system is in a NORMAL mode. In an embodiment, the listening system is adapted to provide at least one of the specific NORMAL mode signals as a vibrational signal (e.g. via the alerting device or the listening device) or as an acoustic signal via the listening device.

In an embodiment, an acoustic signal presented via the listening device (when the listening system is in a NORMAL mode) is a predefined sound signal or a text or spoken message corresponding to an external alarm signal (the external alarm being e.g. detected by the alerting device having a corresponding sound or text-file stored in a memory; alternatively, the sound or a text-file representing a message is stored in a memory of the listening device). In an embodiment, the alerting device or the listening device comprises a speech synthesizer adapted to be able to convert a text-file to a speech signal.

In an embodiment, specific ALARM mode signals issued by the listening system are adapted to catch the attention of the user considering that the listening device is not in operation. Such ALARM mode signals can take on any form adapted for attracting the attention of the user, and may preferably be individually customized to the particular user. In an embodiment, the specific ALARM mode signals comprise amplified versions of corresponding normal acoustic and/or a optical alarm signals.

In an embodiment, the specific NORMAL mode or ALARM mode signals comprise a vibrational signal. In an embodiment, the alerting device is adapted to provide at least one of the specific NORMAL mode or ALARM mode signals as an acoustic alarm signal (e.g. mimicking the original external alarm signal) via a speaker. In an embodiment, the alerting device is adapted to generate or propagate one or more of the specific NORMAL mode or ALARM mode signals. In an embodiment, the alerting device is adapted to provide at least one of the specific NORMAL mode or ALARM mode signals as a vibrational signal (e.g. via a vibrating unit). In an embodiment, the alerting device is adapted to provide at least one of the specific NORMAL mode or ALARM mode signals as a light signal, e.g. a blinking light signal, e.g. from one or more light emitting diodes. In an embodiment, the alerting device is adapted to provide at least one of the specific NORMAL mode or ALARM mode signals as a light signal presented on a display unit, e.g. as text or as an image (e.g. a moving image) or a combination. In an embodiment, the alerting device is adapted to provide at least one of the specific NORMAL mode or ALARM mode signals as a combination of two or more of a light signal, a vibrational signal and an acoustic signal. In an embodiment, the alerting device is adapted to provide at least one of the specific NORMAL mode or ALARM mode signals as a combination of a light signal, a vibrational signal and an acoustic signal.

In an embodiment, the listening system, e.g. the alerting device, is adapted—in a NORMAL mode or in an ALARM mode—to detect an external alarm, e.g. comprising an optical alarm, and to convey a predetermined alarm message (e.g. a sound or a spoken message) representing the external optical alarm to a user via a speaker (e.g. of the alerting device (in a NORMAL or ALARM mode) and/or of the listening device(s) (in a NORMAL mode) or via an external speaker adapted for that purpose).

Alerting Device:

In an embodiment, the alerting device is a device that is separate from the listening device. In an embodiment, the alerting device and the listening device are distinct separate parts that only cooperate electromagnetically via a wired or wireless connection between them. In an embodiment, no wired connections (or connectors) exist between the two parts. In an embodiment, the alerting device comprises an antenna and transceiver circuitry for transmitting an alerting signal to one or more listening devices.

In an embodiment, the alerting device comprises an input transducer for picking up an acoustic and/or an optical alarm signal.

In an embodiment, the alerting device is adapted to be body-worn. In an embodiment, the alerting device forms part of, such as is integrated with, a communication device, e.g. a telephone or an audio delivery device or an audio gateway device, or any other device that the user already carries for other purposes, e.g. a remote control device for controlling functionality and operation of the listening device. This has the advantage that the alerting device is typically always worn by the user anyway, and not implemented as yet another device for the user to manage.

In an embodiment, the functionality of the alerting device is implemented as a software application for a body-worn communication device.

In an embodiment, the alerting device is adapted to recognize a user's own voice, and to establish a communications link to a predefined destination (e.g. a specific telephone number, e.g. to family member or caring person) in response to a specific utterance of the user (cf. e.g. WO 03/098907 A2).

In an embodiment, the alerting device comprises a voice control interface, e.g. including an automatic speech recognition (ASR) algorithm, allowing the system to be controlled by spoken commands or words, e.g. spoken by a particular voice, cf. e.g. US 2008/0183471 A1, e.g. the user's own voice or the voice of a predetermined person, e.g. a person in the user's normal environment.

In an embodiment, the alerting device comprises a local source of energy, such as a battery, e.g. a rechargeable battery.

Alerting Device <-> Alarm Signal Interface:

In an embodiment, the alerting device comprises a wireless receiver for receiving an external alarm transmitted wirelessly from an alarm source. In an embodiment, the alerting device comprises one or more sensors (e.g. a photo detector for detecting a light signal, or an acoustic sensor for detecting an acoustic signal) allowing the alerting device to detect an external alarm. In an embodiment, the alerting device comprises a microphone for picking up an external acoustic alarm signal.

In an embodiment, the listening system comprises an alarm issuing device, so that the interface between the alerting device and the alarm issuing device is an internal interface of the system.

In an embodiment, the external alarm signal comprises a signal from an alarm issuing device in the form of one or more of a door bell, an alarm clock, a telephone, a smoke alarm, a gas alarm, e.g. a CO-alarm, etc. In an embodiment, the external alarm signal comprises a sound signal or a light signal. In an embodiment, the external alarm signal comprises the voice of a person.

A Listening Device:

In an embodiment, the listening device comprises an antenna and transceiver circuitry for receiving a direct electric input signal, e.g. from the alerting device.

In an embodiment, the listening device comprises an output transducer for converting an electric signal to a stimulus perceived by the user as an acoustic signal. In an embodiment, the output transducer comprises a number of electrodes of a cochlear implant or a vibrator of a bone conducting hearing device. In an embodiment, the output transducer comprises a receiver (speaker) for providing the stimulus as an acoustic signal to the user.

In an embodiment, the listening device comprises a hearing instrument, an ear protection device, an earphone, a headset or combinations thereof.

In an embodiment, the listening device is adapted to provide a frequency dependent gain to compensate for a hearing loss of a user. In an embodiment, the listening device further comprises other relevant functionality for the application in question, e.g. acoustic feedback suppression, compression, directionality, noise reduction, etc. In an embodiment, the listening device comprises a signal processing unit for enhancing the input signals and providing a processed output signal. In an embodiment, the listening device comprises an input transducer for converting an input sound to an electric input signal. In an embodiment, the listening device comprises a mixer for mixing a signal from the input transducer of the listening device with a signal originating from the alerting device, and the listening device is adapted for presenting the mixed signal to the user. In an embodiment, the mixing ratio of the signal from the input transducer of the listening device and the signal originating from the alerting device is adapted to allow the user to perceive both signals. Alternatively, a priority is given to the signal originating from the alerting device in the signal from the input transducer of the listening device is attenuated or inhibited when a signal (or at least when a signal representing an alarm signal) from the alerting device is present.

In an embodiment, the listening device comprises a local source of energy, such as a battery, e.g. a rechargeable battery.

Alerting Device <-> Listening Device Signal Interface:

In an embodiment, the listening device and the alerting device comprise a (possibly standardized) electric interface (e.g. in the form of a connector) for receiving/transmitting a wired direct electric signal, so that the listening device and the alerting device can be electrically connected via an electric cable.

In an embodiment, the listening device and the alerting device are adapted to be in wireless communication with each other. In an embodiment, the listening device and the alerting device are adapted to establish a wireless communication link between them. In an embodiment, the wireless communication link is based on near-field communication, e.g. inductive communication, e.g. according to a standard (e.g. NFC) or a proprietary protocol (e.g. US 2005/0255843 A1). In an embodiment, the wireless communication link is uni-directional, e.g. from the alerting device to the listening device, thereby allowing alarm messages to be sent to the listening device in NORMAL mode. Alternatively, the wireless communication link is uni-directional from the listening device to the alerting device, thereby e.g. enabling a signal from the listening device to be transmitted to the alerting device indicating whether the listening device is in a NORMAL mode. This allows the alerting device to issue an alarm signal (e.g. via acoustic/light/vibration) when the listening device is NOT in a NORMAL mode (e.g. because no operational connection can be/is established between the listening device and the alerting device; e.g. indicated in the alerting device by its not receiving otherwise regularly issued signals from the listening device). In an embodiment, the (wireless) communication link is bi-directional, allowing e.g. status information to be transmitted from the listening device to the alerting device as well as allowing alarm messages to be sent to the listening device in NORMAL mode.

An example of a system comprising a listening device (hearing instrument) and an audio selection device (audio gateway) is e.g. described in EP 1 460 769 A1. Inductive communication (i.e. communication based on electromagnetic induction as opposed to electromagnetic radiation) between a hearing instrument and an audio gateway device in accordance with a standard or proprietary protocol is e.g. described in EP 1 480 492 A2.

In an embodiment, the wireless communication link is adapted to transmit in a frequency range above 100 kHz, e.g. in the MHz or GHz range, e.g. below 30 GHz.

In an embodiment, the listening device and the alerting device comprise demodulation circuitry for demodulating/modulating a received/transmitted signal.

MODE Detection:

In an embodiment, the listening system is adapted to be brought into a NORMAL mode when the listening device is switched ON (i.e. the listening device is brought into an operational state, where the main functionality of the listening device is activated, including its ability to convert an electric signal to a stimulus perceived by the user as an acoustic signal). In an embodiment, the listening system is adapted to be brought into an ALARM mode when the listening device is switched OFF (i.e. the listening device is brought into a non-operational state, where the main functionality of the listening device is de-activated). In an embodiment, the system is adapted to provide that the ON/OFF status of the listening device is detected by the alerting device. In an embodiment, the listening system is adapted to provide that the alerting device comprises a user interface allowing ON/OFF switching to be performed by the user via the alerting device (the alerting device thereby working as a remote control of the listening device).

In an embodiment, information about the current operational status (e.g. ON or OFF or a more complex indication, e.g. a partial power down) of the listening device(s) is stored in a memory of the listening system, e.g. of the alerting device.

In an embodiment, the listening device comprises a sensor for detecting whether or not the listening device is in an operational state (e.g. by detecting whether or not the listening device is presently mounted at or in an ear of user, cf. e.g. U.S. Pat. No. 4,955,729 or U.S. Pat. No. 7,522,739). In an embodiment, the listening device comprises a temperature sensor for measuring a temperature in or around the listening device (e.g. at a surface of a housing of the listening device). When the temperature sensed by the temperature sensor is above or below a predefined (e.g. configurable) threshold temperature (e.g. 32° C.), the listening device is taken to be located or NOT located, respectively, in or at an ear of a user, and the listening system is correspondingly taken to be in a NORMAL and an ALARM mode, respectively. In an embodiment, the listening system is adapted to transfer information defining whether or not the listening device is in an operational state to the alerting device (e.g. via a wireless link). In an embodiment, the listening system is adapted to transfer information defining only whether the listening device is in an operational state to the alerting device (whereas information of the OFF-state is NOT transferred). In an embodiment, the listening device comprises an ON/OFF activation element. In an embodiment, the listening device is adapted to transfer the status (ON and/or OFF) from the listening device to the alerting device, at least (such as only) when a change of status occurs.

In an embodiment, the listening system is adapted to be brought into a NORMAL mode or an ALARM mode dependent on a quality measure of the wireless communication link between the listening device and the alerting device. In an embodiment, the measure of the quality of the link is based on the gain of an automatic gain control (AGC) unit necessary to achieve a predefined signal to noise ratio (S/N) or bit error rate (BER) of the received signal and/or based on a field strength of the received signal (cf. e.g. EP 2211579 A1). When two listening devices of a binaural listening system are placed closely together (e.g. on a table or in a box or bag), and thus obviously not in a NORMAL mode, the signal strength of a wireless signal between the listening devices will be higher than normal. This can be taken as an indicator that the devices are not located in or at the ears of a user and used to bring the listening system in an ALARM mode (e.g. via a wireless link between the listening device(s) and the alerting device). Similarly, if no connection can be established between the alerting device and a listening device, it is concluded that the listening device(s) is/are not in NORMAL mode and used to bring the listening system in an ALARM mode.

In an embodiment, the listening device(s) comprises a leakage detector for detecting leakage of sound from a loudspeaker to a microphone of the listening device. Various implementations of leakage detection have been proposed, cf. e.g. WO 2010/049543 A2 or US 2010/0226516 A1. In an embodiment, the listening system is adapted to be brought into a NORMAL mode or an ALARM mode dependent on the amount of leakage detected by the leakage detector, e.g. based on a leakage measure. When the amount of leakage detected is below or above a predefined threshold, the listening device is taken to be located or NOT located, respectively, correctly in or at an ear of a user, and the listening system is correspondingly taken to be in a NORMAL and an ALARM mode, respectively.

In an embodiment, the listening device is assumed to be in a non-operational state when a quality measure of the wireless communication link between the listening device and the alerting device is in a predefined (ALARM) range or when no link between the two devices can be established. In such case, the listening system is brought into an ALARM mode (even though the listening device is assumed to be ON). In other words, a non-operational state of the listening device is assumed (i.e. an ALARM state of the system) because the listening device and the alerting device are either too close to or too far from each other to establish a wireless link (e.g. a bi-directional link) of sufficient quality between them.

In an embodiment, the listening system comprises first and second listening devices of a binaural system (e.g. two hearing instruments). In an embodiment, the listening system is adapted to be in a NORMAL mode when the first and second listening devices are within a typical range of distances from each other (e.g. 0.10 to 0.40 m). In an embodiment, the first and second listening devices are assumed to be in an operational state (and thus the listening system to be en a NORMAL mode) when a link between the alerting device and each of the two devices can be established with a quality measure in a predefined (NORMAL) range. In an embodiment, the system is adapted to provide that the distance between the two listening devices can be estimated and used to detect whether or not the two devices are in an operational state (i.e. are within or out of a NORMAL range of distances from each other, cf. e.g. US 2008/0226107 A1). In an embodiment, a non-operational state of the first and second listening devices is assumed (i.e. an ALARM state of the listening system), when the listening first and second devices are either too close to or too far from each other to establish a wireless link (e.g. a bi-directional link) of sufficient quality between them.

In an embodiment, the listening system is adapted to provide that ON/OFF switching of the listening device(s) can be performed automatically by the alerting device, e.g. based on predefined criteria (such as a detected distance between two listening devices of the system or between a listening device and the alerting device). In an embodiment, the listening system is adapted to provide that the listening device(s) is/are switched ON automatically by the alerting device in case an external alarm signal is received or detected by the alerting device.

LEARNING Mode:

In an embodiment, the listening system is adapted to be brought into a LEARNING mode, wherein the system is taught (adapted to learn) the specifics of the external alarms that it is expected to react to and convey to the user, (in particular) when the system is in an ALARM mode. Hence, the typical sources of alarm signals or sounds or voices that may be relevant for a situation where the user is unable to hear such signals or sounds or voices (ALARM mode) should preferably be identified for a particular user and a particular environment. The sources of more than one typical environment may preferably be defined, e.g. one or more private environments and/or one or more other environments. This may result in one or more profiles (comprising relevant learned alarm signals for a given environment) that may be activated in the alerting device according to the present environment.

In an embodiment, the listening system—when brought into a LEARNING mode—is adapted to recognize the external alarm signals that a particular user is expected to encounter, e.g. in the user's home and/or working environment. In an embodiment, the listening system is adapted to recognize a sound from a particular door bell, a particular telephone, a particular alarm device (clock, gas, smoke, fire), etc. In an embodiment, the listening system is adapted to recognize a particular voice, e.g. a voice of the person's normal environment, e.g. a wife or husband or child or a care assistant. In an embodiment, the listening system is adapted to recognize one or more particular words (e.g. 'HELP' or 'WATCH OUT'), e.g. when spoken by a particular voice. The classification of various acoustic environments (e.g. specific alarm sounds or specific voices or words) using a learning mode is e.g. described in US 2003/144838 A1 or U.S. Pat. No. 7,742,612 B2.

General, Peripheral Devices and Connections:

In an embodiment, the listening system comprises one or more other devices (e.g. sensors, e.g. comprising a microphone and/or a photo detector) for picking up an external alarm and transmitting the picked up alarm (or a signal derived therefrom) to the alerting device. In an embodiment, the listening system is adapted to provide that a wireless link between the one or more other devices (e.g. sensors, such as a separate microphone and/or a photo detector) and the alerting device can be established, e.g. based on a standardized protocol, e.g. Bluetooth.

In an embodiment, the listening system is adapted to allow a separate microphone to be operationally connected to the listening device (e.g. via the alerting device or another intermediate device, e.g. an audio gateway). In an embodiment, the separate microphone is adapted for being located at another location than at or on the user of the listening device. In an embodiment the separate microphone is adapted for picking up a voice signal from another person than the user. In an embodiment, the listening system is adapted to provide that sounds picked up by the separate microphone are transmitted to the alerting device and—when the system is in an ALARM mode—to provide that a sound signal is presented via a speaker of the alerting device.

In an embodiment, the separate microphone is adapted to be located near an acoustic alarm source and—when an acoustic alarm from said acoustic alarm source is detected—to transmit said acoustic alarm (or an alarm indication signal) to the alerting device. In an embodiment—when the listening system is in a NORMAL mode—the listening system is adapted to provide that the acoustic alarm signal (or a signal derived from or generated on the basis of an alarm indication signal) is transmitted to the listening device(s) and played for the user via an output transducer of the listening device(s). In an embodiment—when the listening system is in an ALARM mode—the listening system is adapted to provide that the acoustic alarm signal (or a signal derived from or generated on the basis of an alarm indication signal) is played for the user via an output transducer of the alerting device.

In an embodiment, the listening system is adapted to allow a separate photo detector (e.g. located near an optical alarm source) to be operationally connected to the listening device via the alerting device. In an embodiment, the listening system is adapted—when an optical alarm from said optical alarm source is detected—to transmit an alarm indication signal representing the optical alarm to the alerting device. In an embodiment, the alerting device comprises a memory wherein relevant alarm indication signals representing different optical alarms are stored, and wherein each optical alarm is associated with a vibrational or acoustical alarm generated by the alerting device when a corresponding alarm indication signal has been received by the alerting device. Alternatively or additionally, a signal representing an acoustic alarm corresponding to a particular alarm indication signal (representing a particular optical alarm) is transmitted to the listening device(s) and presented to the wearer of the listening device, when the listening device(s) is/are in an operational state (NORMAL mode of the listening system). Alternatively or additionally, the alarm indication signals representing particular optical alarm signals may be presented to the user via a display of the alerting device.

In an embodiment, the listening system comprises a voice control interface, e.g. including an automatic speech recognition (ASR) algorithm, allowing the system to be controlled by spoken commands or words, e.g. spoken by a particular voice, e.g. the user's own voice or a predetermined person, e.g. in the user's normal environment.

Use of a Listening System:

Use of a listening system as described above, in the detailed description of 'mode(s) for carrying out the invention' and in the claims is further more provided. In a particular embodiment, use in a binaural hearing aid system or in an active ear protection system is provided.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which:

FIG. 1 shows different application scenarios for a listening system according to embodiments of the present disclosure.

Figure 2:
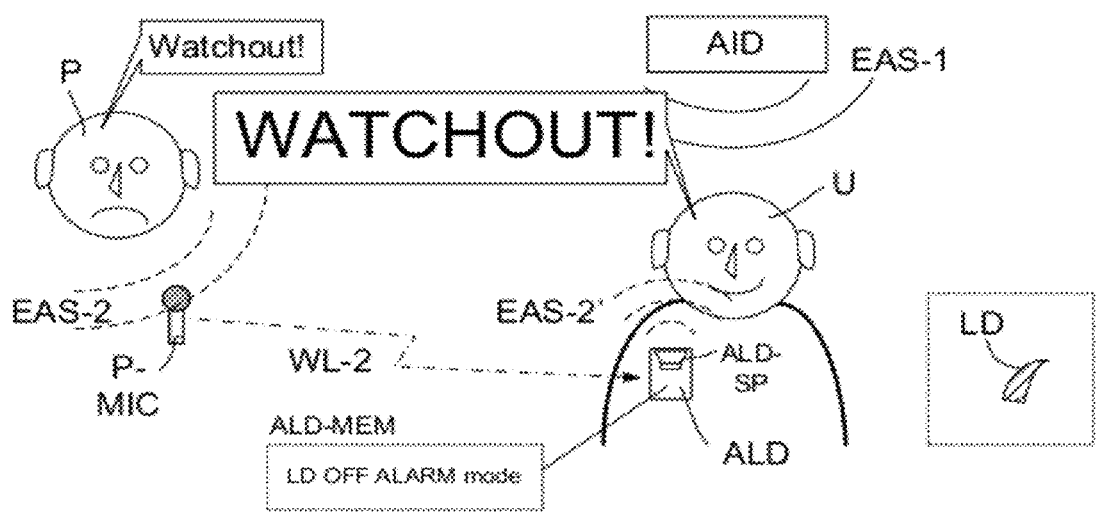
FIG. 2 shows a further application scenario for a listening system according to an embodiment of the present disclosure.

The figures are schematic and simplified for clarity, and they just show details which are essential to the understanding of the disclosure, while other details are left out.

Further scope of applicability of the present disclosure will become apparent from the detailed description given hereinafter. However, it should be understood that the detailed description and specific examples, while indicating preferred embodiments of the disclosure, are given by way of illustration only. Various changes and modifications within the scope of the disclosure will become apparent to those skilled in the art from this detailed description.

MODE(S) FOR CARRYING OUT THE INVENTION

FIG. 1 shows different application scenarios for a listening system according to embodiments of the present disclosure.

FIG. 1 shows embodiment of a listening system comprising a listening device (LD) adapted to be worn at or in an ear of a user (U), and a separate alarm detection and alerting device (ALD) adapted to be in communication with the listening device. An alarm issuing device (AID) adapted to issue a normal acoustic and/or a optical alarm signal subject to certain predefined triggering conditions is shown in the vicinity of the user. The alerting device (ALD) is adapted to sense or register (e.g. to receive information about, and e.g. to store in a memory) whether or not the listening device is in operational use (in an operational state). The listening system is adapted to operate in at least two modes, a NORMAL mode, when the listening device is in operational use, and an ALARM mode, when the listening device is NOT in operational use (in a non-operational state). The listening system is adapted to issue specific ALARM mode signals to the user corresponding to (i.e. substituting) the normal acoustic and/or optical alarm signals, when the listening system is in an ALARM mode (e.g. when the user has removed the listening devices and/or turned the power off). In the embodiments shown in FIG. 1, the listening device LD is embodied in a hearing instrument comprising a part adapted for being located behind the ear of a user. In FIGS. 1a, 1b and 1c, the listening system is assumed to be in a NORMAL mode, whereas in FIG. 1d, the listening system is assumed to be in an ALARM mode.

FIG. 1a shows a first application scenario, wherein the listening system is in a NORMAL mode in that the listening device (LD) is worn at the ear of the user (U) in an operational state (power switched ON). The alarm issuing device (AID) issues an external alarm (EAS), e.g. an acoustic alarm, and, simultaneously, wirelessly transmits the alarm to the alerting device (ALD) via a wireless link (WL-1). The alerting device (ALD) comprises a transceiver for receiving (and possibly demodulating) the transmitted alarm signal from the alarm issuing device (AID) and further comprises a transceiver for transmitting the extracted alarm signal (or a signal derived therefrom or corresponding thereto) to the listening device via a wireless communication link (WL-3). The listening device (LD) comprises a transceiver for receiving (and possibly demodulating) the transmitted alarm signal from the alerting device (ALD) and further comprises an output transducer (e.g. a speaker) for presenting the extracted alarm signal (or a signal derived therefrom or corresponding thereto) to the user (U). This ensures that the user receives the alarm signal (in case the acoustically propagated external alarm signal is NOT properly received by the microphone system of the listening device). If the listening system is in an ALARM mode (where the user (U) e.g. has turned the power to the listening device OFF, or if the listening device is out of reach of the transmitter of the alerting device), the transmitted alarm received by the alerting device is e.g. indicated to the user by the alerting device (ALD) via an acoustic, optical and/or tactile indication, e.g. generated by corresponding units of the alerting device, cf. e.g. FIG. 3b.

FIG. 1b shows a second application scenario, similar to the first scenario of FIG. 1a. A difference between the two scenarios is that the alarm issuing device (AID) of the embodiment of FIG. 1b issues an external alarm (EAS) only as an acoustic alarm. Hence, in the embodiment of the listening system shown in FIG. 1b, the alerting device comprises a microphone (ALD-MIC) to pick up the external acoustic alarm. Further, the electrical connection between the alerting device and the listening device is provided by a wired connection between the two devices (instead of the wireless connection WL-3 of FIG. 1a). The signal picked up by the microphone of the alerting device can thus—in a NORMAL mode—be transmitted to the listening device via the wired connection and presented to the user via an output transducer of the listening device. As described above in connection with FIG. 1a, when the listening system is in an ALARM mode, the alarm received by the alerting device (here picked up by microphone ALD-MIC) can be indicated to the user by the alerting device (ALD) via an acoustic, optical and/or tactile indication.

FIG. 1c shows a third application scenario, similar to the first scenario of FIG. 1a. A difference between the two scenarios is that a separate other device (SD, here comprising a microphone and a wireless transmitter T) for picking up an external alarm and wirelessly transmitting the picked up alarm (or a signal derived therefrom) to the alerting device (ALD), via a wireless link (WL-4), e.g. based on a standardized protocol, e.g. Bluetooth. As described above in connection with FIG. 1a, when the listening system is in an ALARM mode, the alarm received by the alerting device (here wirelessly from the separate device, SD) can be indicated to the user by the alerting device (ALD) via an acoustic, optical and/or tactile indication.

FIG. 1d shows a fourth application scenario, similar to the first scenario of FIG. 1a. A difference between the two scenarios is that the listening system is assumed to be in an ALARM mode, because the listening device LD is in a non-operational state (e.g. put away in a container). Further, the alarm issuing device (AID) issues the external alarm (EAS) only as an acoustic alarm. Hence, in the embodiment of the listening system shown in FIG. 1d, the alerting device (ALD) comprises a microphone (ALD-MIC) to pick up the external acoustic alarm. The alerting device comprises an output transducer (ALD-SP, here a speaker) for propagating the alarm signal picked up by the microphone (ALD-MIC) as an ALARM mode signal EAS' to the user as an acoustic alarm signal. In a NORMAL mode, the signal picked up by the microphone (ALD-MIC) of the alerting device (ALD) can be transmitted to the listening device via a wired (cf. FIG. 1b) or a wireless connection (cf. FIG. 1a or 1c) and presented to the user via an output transducer of the listening device.

FIG. 2 shows a further application scenario for a listening system according to an embodiment of the present disclosure. The listening system is in an ALARM mode (where the listening device LD is in a non-operational state (e.g. put away in a container, low on batteries or otherwise not in use). An alarm issuing device AID issues an acoustic alarm EAS-1. A person (P) in the user's (U) environment issues a warning EAS-2 (outcry Watchout!) to the user (intended to alert the user to the alarm and/or to events causing the alarm). In the embodiment of FIG. 2, the person P wears a separate microphone (P-M/C) adapted to transmit the signal picked up by the microphone to the alerting device via a wireless link WL-2. (e.g. based on FM or Bluetooth, DECT or NFC a any other appropriate standard or proprietary protocol). The alerting device ALD comprises a memory (ALD-MEM) wherein the current status of the listening system is stored (here 'LD OFF ALARM mode' indicating that the listening device (LD) is in a non-operational state (OFF) and that the system is in ALARM mode). The alerting device is adapted to receive and extract the signal picked up by the microphone (P-NC) and propagate the signal to the user via a speaker (ALD-SP) of the alerting device as an ALARM mode signal EAS' (WATCHOUT!, e.g. amplified to allow the user (U) to hear it without use of the listening device). The acoustic alarm may be combined with a tactile indication and/or an optical indication (e.g. via an LED or a display) provided by corresponding units of the alerting device. In an embodiment, the alerting device comprises a speech recognition module allowing the alerting device to recognize spoken words and/or to differentiate a voice of a particular person from other voices and/or to only react on predefined code words (such as 'watch-out' or 'look-out' or 'help'). In an embodiment, the spoken input to the speech recognition module of the alerting device is received from the separate microphone (P-MIC) worn by a person in the user's environment. Alternatively, the spoken input to the speech recognition module may be picked up directly by a microphone (cf. ALD-MIC in FIG. 1 or 3) of the alerting device (ALD). In an embodiment, the alerting device is adapted to only propagate the signal from the microphone (P-MIC or ALD-MIC) to the listening device, in case a particular voice and/or word or sound is identified.

Figure 3A:
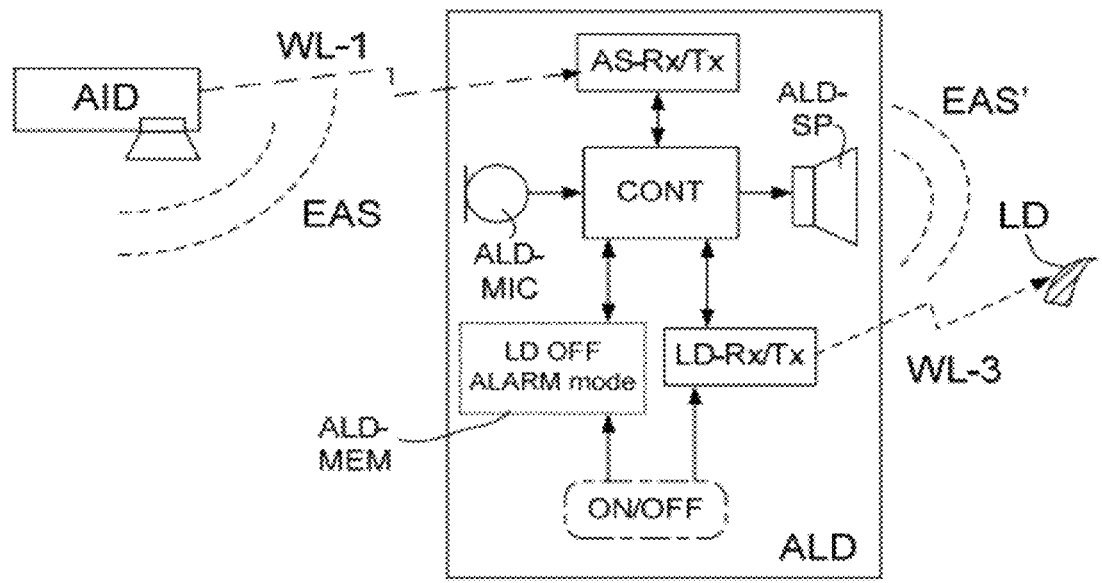
FIG. 3 shows further application scenarios for a listening system according to an embodiment of the present disclosure.
Figure 3B:
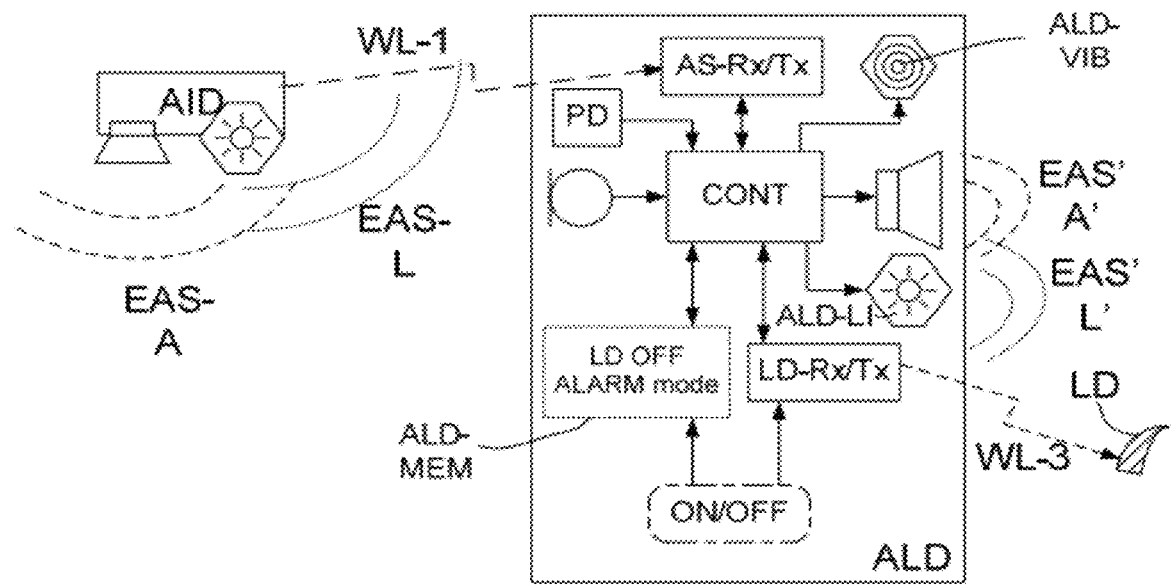

FIG. 3 shows further application scenarios for a listening system according to an embodiment of the present disclosure. FIGS. 3a and 3b shows embodiments of a listening system comprising a body-worn alerting device (ALD) and a listening device (LD) adapted to be in wireless communication with each other (at least to allow a uni-directional wireless communication link between the two devices to be established). The alerting device is adapted to receive an external alarm from an alarm issuing device (AID) via a wireless connection (WL-1). For this purpose, the alerting device comprises a wireless transceiver (AS-Rx/Tx), at least comprising antenna and receiver circuitry allowing a reception (and possibly demodulation) and extraction of an alarm signal (or an alarm indication signal) from the received signal. The alerting device (ALD) further comprises a microphone (ALD-MIC) adapted to pick up sounds from the environment of the alerting device, including the external (acoustic) alarm(s) (EAS) issued by one or more alarm issuing device(s) in the environment of the alerting device (here from a speaker or other acoustic transducer of the alarm issuing device AID). The alerting device (ALD) further comprises a speaker (ALD-SP) adapted to propagate a specific ALARM (and/or NORMAL) mode signal (EAS) to a user (U). A user interface (ON/OFF) in operable communication with a memory (ALD-MEM) is furthermore included in the alerting device. The current status of the listening system is stored in the memory (ALD-MEM) (here 'LD OFF ALARM mode' indicating that the listening device (LD) is in a non-operational state (OFF) and that the system is in ALARM mode). The user interface (ON/OFF) can e.g. comprise a user operable activation element (e.g. a button or other selection element, e.g. a touch sensible part of a display). The listening system is adapted to provide that the listening device can at least be set in an operational mode (ON) or a non-operational mode (OFF) via the user interface. Thereby, the listening system is correspondingly brought into NORMAL and ALARM-mode, respectively, and the relevant status is stored in the memory (ALD-MEM). Other, user initiated operations (related to the listening device and/or to the alerting device) may be included via the user interface, e.g. volume control of the listening device. The listening system is adapted to provide that a wireless communication link (WL-3) can be established between the alerting device and the listening device. The alerting device (ALD) comprises a wireless interface to the listening device (LD) in the form of (possibly modulation and) transceiver and antenna circuitry (LD-Rx/Tx) allowing at least a uni-directional communication from the alerting device to the listening device. The listening system is adapted to allow control signals (e.g. ON- or OFF-instructions) and audio signals (e.g. from a microphone input or any other audio input) to be transmitted on the wireless communication link (WL-3) from the alerting device to the listening device. A control unit (CONT) is operatively coupled to the wireless interfaces (AS-Rx/Tx and LD-Rx/Tx), to the memory (ALD-MEM), and to the transducers (input (ALD-MIC) and output (ALD-SP)) of the alerting device. The control unit controls how the input signals from the wireless link (WL-1), from the microphone (ALD-MIC), and from the user interface (ON/OFF) are coupled to the listening device (LD) via the wireless interface (WL-3) and/or the speaker (ALD-SP) dependent on the status of the listening system (as determined via the user interface (ON/OFF) and read from the memory (ALD-MEM)).

The embodiment of FIG. 3b may comprise the same elements as discussed in connection with the embodiment of FIG. 3a. The alarm issuing device (AID) of the embodiment of FIG. 3b additionally (or alternatively) comprises a light source for issuing the external alarm signal as a light signal EAS-L (in addition to or as an alternative to an acoustically issued external alarm signal EAS-A). Correspondingly, the alerting device (ALD) additionally (or alternatively) comprises a photo detector (PD) for detecting the light signal EAS-L. The alerting device further comprises a light source (ALD-LI, e.g. a light emitting diode (LED) or a display, e.g. a LCD) for presenting the received external alarm signal (e.g. the received light signal EAS-L or a signal derived therefrom) as a specific ALARM mode signal (EAS'-L') to a user (U) in addition to (or as an alternative to) an acoustically presented specific ALARM mode signal (EAS'-A'). The alerting device may further comprise a vibrational element for (ALD-VIB) for producing a tactile input to the user (U). The vibrational element for (ALD-VIB), the photo detector (PD) and the light source (ALD-LI) are operatively coupled to the control unit (CONT). The control unit is adapted to control the coupling of the input signals (from the photo detector) to the output transducers (including the light source) and the activation of the vibrational element, dependent on the current status of the listening system (and predefined settings).

In an embodiment, the memory (ALD-MEM) comprises predefined settings defining the coupling of input transducers to output transducers (incl. the vibrational element) in various modes of the listening system. In an embodiment, the memory (ALD-MEM) comprises predefined sound signals and/or text or spoken messages and/or images intended to be played for the user (via the speaker of the alerting device or the listening device) or shown on a display of the listening device depending on the modes of the listening system and possibly on predefined settings. In an embodiment, the memory (ALD-MEM) comprises predefined settings (profiles) defining learned alarm signal sources in a typical environment of the user.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

U.S. Pat. No. 7,522,739 (SIEMENS AUDIOLOGISCHE TECHNIK) Nov. 17, 2005
WO 2008/055960 A1 (IBM) May 15, 2008
US 2009/0076816 A1 (BIONICA) Mar. 19, 2009
US 2009/0010466 A1 (Haikonen) Jan. 8, 2009
WO 2008/067638 A1 (HARMONYA TECHNOLOGIES) Jun. 12, 2008
WO 03/098907 A2 (UNIVERSITY OF EDINBURGH) Nov. 27, 2003
US 2008/0183471 A1 (AT&T) Jul. 31, 2008
US 2005/0255843 A1 (STARKEY, OTICON) Nov. 17, 2005
EP 1 460 769 A1 (PHONAK) Sep. 22, 2004
EP 1 480 492 A2 (SIEMENS AUDIOLOGISCHE TECHNIK) Nov. 24, 2004
U.S. Pat. No. 4,955,729 (Günter Marx) Sep. 11, 1990
U.S. Pat. No. 7,522,739 (SIEMENS AUDIOLOGISCHE TECHNIK) Nov. 17, 2005
EP 2211579 A1 (OTICON) Jul. 28, 2010
WO 2010/049543 A2 (PHONAK) May 6, 2010
US 2010/0226516 A1 (SIEMENS MEDICAL INSTRUMENTS) Sep. 9, 2010
US 2008/0226107 A1 (SIEMENS AUDIOLOGISCHE TECHNIK) Sep. 18, 2008
US 2003/144838 A1 (PHONAK) Jul. 31, 2003
U.S. Pat. No. 7,742,612 B2 (SIEMENS AUDIOLOGISCHE TECHNIK) May 19, 2005

The invention claimed is:
1. A listening system, comprising:
a listening device adapted to provide a frequency dependent gain to compensate for a hearing loss of a user and to be worn at or in an ear of a user, and
an alerting device adapted to detect or receive an external alarm signal, wherein
the listening device and the alerting device each comprise at least one communication interface allowing to establish a communication link between them,
the alerting device is adapted to sense or receive information as to whether or not the listening device is in operational use, and
the listening system is adapted to operate in at least two modes, a NORMAL mode, when said listening device is in operational use, and an ALARM mode, when said listening device is NOT in operational use; and wherein said listening system is adapted to issue specific NORMAL mode signals to the user corresponding to normal acoustic and/or optical alarm signals, when said listening system is in said NORMAL mode, and specific ALARM mode signals to the user corresponding to said external alarm signals, when said listening system is in said ALARM mode, wherein said specific ALARM mode signals are adapted to catch the attention of the user considering that the listening device is not in operation, and wherein said listening system is adapted to be brought a) into said NORMAL mode when the listening device is switched ON, and b) into said ALARM mode when the listening device is switched OFF.

2. A listening system according to claim 1 wherein the listening device comprises a sensor for detecting whether or not the listening device is in an operational state.

3. A listening system according to claim 2 wherein said specific ALARM mode signals comprise one or more of an acoustic signal, an optical signal and a vibrational signal.

4. A listening system according to claim 2 wherein said alerting device is adapted to generate or propagate one or more of said specific ALARM mode signals.

5. A listening system according to claim 4 wherein said alerting device is adapted to provide at least one of said specific ALARM mode signals as a vibrational signal.

6. A listening system according to claim 1 wherein said communication interface is adapted for establishing a wireless communication link.

7. A listening system according to claim 1 adapted to be brought into a NORMAL mode or an ALARM mode dependent on a quality measure of the wireless communication link between the listening device and the alerting device.

8. A listening system according to claim 7 wherein said alerting device is adapted to provide at least one of said specific NORMAL mode signals as a vibrational signal and/or as an acoustic signal via said listening device.

9. A listening system according to claim 1 wherein said alerting device comprises an input transducer for picking up an acoustic and/or an optical alarm signal.

10. A listening system according to claim 1 wherein said alerting device is adapted to be body-worn.

11. A listening system according to claim 1 wherein said alerting device forms part of a communication device, e.g. a telephone or an audio delivery device or an audio gateway device, or any other device that the user already carries for other purposes.

12. A listening system according to claim 1 wherein said listening device comprises a hearing instrument, an ear protection device, an earphone, a headset or combinations thereof.

13. A listening system according to claim 1 comprising a voice control interface, e.g. including an automatic speech recognition (ASR) algorithm, allowing the system to be controlled by spoken commands or words, e.g. spoken by a particular voice, e.g. the user's own voice or a predetermined person, e.g. in the user's normal environment.

14. A listening system according to claim 1 adapted to be brought into a LEARNING mode, wherein the system is adapted to learn specifics of external alarms that it is expected to react to and convey to the user.

15. A listening system according to claim 1 wherein the listening device comprises a leakage detector and the listening system is adapted to be brought into a NORMAL mode or an ALARM mode dependent on the amount of leakage detected by the leakage detector.

16. A listening system according to claim 1 adapted to alert the user through the listening device(s) in a NORMAL operational mode, and to use alternative alerts when the system is in an ALARM mode.

17. A listening system according to claim 1, wherein the communication link is bi-directional allowing status information to be transmitted from the listening device to the alerting device.

18. A listening system according to claim 14 wherein typical sources of alarm signals or sounds or voices that are relevant for a situation where the user is unable to hear such signals or sounds or voices are identified for a particular user and a particular environment.

19. A listening system according to claim 18 wherein sources of more than one typical environment are defined, resulting in one or more profiles each comprising relevant learned alarm signals for a given environment that may be activated in the alerting device according to the present environment.

20. A listening system according to claim 14 which, when brought into a LEARNING mode, is adapted to recognize the external alarm signals that a particular user is expected to encounter.

21. A listening system according to claim 14 wherein the listening system is adapted to recognize a sound from a particular door bell, a particular telephone, a particular alarm device, or a particular voice.

22. A listening system according to claim 21 wherein the particular voice is a voice of the person's normal environment, e.g. a wife or husband or child or a care assistant.

23. A listening system according to claim 14 adapted to recognize one or more particular words when spoken by a particular voice.

* * * * *